United States Patent
Koh et al.

(10) Patent No.: US 11,657,685 B2
(45) Date of Patent: May 23, 2023

(54) DEVICE AND METHOD FOR PROVIDING FEEDBACK BASED ON INPUT

(71) Applicants: HYUNDAI MOTOR COMPANY, Seoul (KR); KIA MOTORS CORPORATION, Seoul (KR)

(72) Inventors: Jin Young Koh, Suwon-si (KR); Seung Bo Shim, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 103 days.

(21) Appl. No.: 16/952,577

(22) Filed: Nov. 19, 2020

(65) Prior Publication Data

US 2022/0058923 A1 Feb. 24, 2022

(30) Foreign Application Priority Data

Aug. 18, 2020 (KR) .................. 10-2020-0103410

(51) Int. Cl.
*G08B 6/00* (2006.01)
*G06F 3/01* (2006.01)
*G06F 3/04883* (2022.01)

(52) U.S. Cl.
CPC .............. *G08B 6/00* (2013.01); *G06F 3/016* (2013.01); *G06F 3/04883* (2013.01)

(58) Field of Classification Search
CPC . G08B 6/00; B60K 2370/143; G06F 3/03547; G06F 3/04883; G06F 3/016
See application file for complete search history.

(56) References Cited

U.S. PATENT DOCUMENTS

| | | | | |
|---|---|---|---|---|
| 6,157,372 A * | 12/2000 | Blackburn | ........... | B60N 2/0228 345/157 |
| 8,174,372 B2 * | 5/2012 | da Costa | ................ | H03K 17/96 340/407.1 |
| 8,294,681 B2 * | 10/2012 | Lee | .......................... | H04N 21/47 345/173 |
| 9,209,803 B2 * | 12/2015 | Bruwer | ................ | H03K 17/962 |
| 9,971,441 B2 * | 5/2018 | Hunt | ........................ | G06F 3/016 |
| 10,936,108 B2 * | 3/2021 | Czelnik | ................. | G06F 3/0416 |
| 10,956,017 B2 * | 3/2021 | Lee | .......................... | G04G 21/08 |
| 2010/0053087 A1 * | 3/2010 | Dai | ......................... | G06F 3/0202 178/18.06 |
| 2013/0268847 A1 * | 10/2013 | Kim | ....................... | G06F 3/0488 715/251 |
| 2015/0293592 A1 * | 10/2015 | Cheong | ................... | G06F 1/163 345/173 |
| 2017/0206877 A1 * | 7/2017 | Ahn | ...................... | G10H 1/0066 |

* cited by examiner

*Primary Examiner* — John A Tweel, Jr.
(74) *Attorney, Agent, or Firm* — Morgan, Lewis & Bockius LLP

(57) ABSTRACT

A device for providing feedback based on an input according to the present disclosure includes a sensor for sensing an input signal corresponding to the input of a user, and a controller that determines the input of the user as at least one of a touch operation, a press operation, or a swipe operation based on the input signal, and provides feedback corresponding to the determination result. The device may provide feedback using a haptic or sound output scheme based on the input of the user, thereby allowing the user to intuitively recognize an input function.

18 Claims, 12 Drawing Sheets

| SWIPE & DRAG MANIPULATION SPECIFICATION | | SWIPE OPERATION (TO BE REVIEWED FOR OPTIMIZATION OF OPERATION SPECIFICATION) | DRAG OPERATION | OUTPUT FREQUENCY |
|---|---|---|---|---|
| 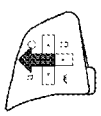 | | SWIPE DIRECTION: DOWN -> UP EQUAL TO OR MORE THAN 10 mm<br>TOUCH TIME: 150~400 ms TOUCH | TOUCH FOR TIME EQUAL TO OR GREATER THAN 500 ms | 400Hz |
| 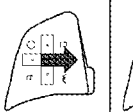 | | SWIPE DIRECTION: UP -> DOWN EQUAL TO OR MORE THAN 10 mm<br>TOUCH TIME: 150~400 ms TOUCH | TOUCH FOR TIME EQUAL TO OR GREATER THAN 500 ms | 400Hz |
| 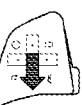 | | SWIPE DIRECTION: RIGHT -> LEFT EQUAL TO OR MORE THAN 10 mm<br>TOUCH TIME: 150~400 ms TOUCH | TOUCH FOR TIME EQUAL TO OR GREATER THAN 500 ms | 400Hz |
| 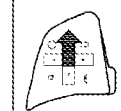 | | SWIPE DIRECTION: LEFT -> RIGHT EQUAL TO OR MORE THAN 10 mm<br>TOUCH TIME: 150~400 ms TOUCH | TOUCH FOR TIME EQUAL TO OR GREATER THAN 500 ms | 400Hz |
| 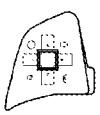 | | INPUT PRESSURE EQUAL TO OR GREATER THAN 3 N | — | 2kHz |

Fig.3

DEVICE AND METHOD FOR PROVIDING FEEDBACK BASED ON INPUT

CROSS-REFERENCE TO RELATED APPLICATION

This application claims the benefit of priority to Korean Patent Application No. 10-2020-0103410, filed in the Korean Intellectual Property Office on Aug. 18, 2020, the entire contents of which are incorporated herein by reference.

TECHNICAL FIELD

The present disclosure relates to a device and a method for providing feedback based on an input.

BACKGROUND

An audio button, an operation switch of an air conditioner, and the like are mounted on a steering wheel to conveniently perform an operation of an audio or the air conditioner while a vehicle travels. A user may operate a desired function by manipulating the button or the switch mounted on the steering wheel.

In general, the user manipulates the button or the switch with a sense of a hand without staring at the steering wheel. Further, it may be determined that the button or the switch is manipulated when a feeling of manipulation is transmitted by a tact mounted at a bottom of the button or the switch mounted on the steering wheel. However, because the user feels the same feeling of manipulation when manipulating the button or the switch mounted on the steering wheel, the user does not receive intuitive feedback on what function the user operated by oneself. Accordingly, the user repeatedly manipulates the button or the switch, and the function malfunctions or operates repeatedly, thereby causing inconvenience to the user.

SUMMARY

The present disclosure has been made to solve the above-mentioned problems occurring in the prior art while advantages achieved by the prior art are maintained intact.

An aspect of the present disclosure provides a device and a method for providing feedback based on an input that provide feedback based on an input of a user to allow the user to intuitively recognize an input function input.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for providing feedback includes a sensor for sensing an input signal corresponding to an input, and a controller that determines the input as at least one of a touch operation, a press operation, or a swipe operation based on the input signal, and provides feedback corresponding to the determination result.

In one implementation, the controller may determine the input as the touch operation and provide first haptic feedback when the sensor senses a change in a quantity of electric charge at a plurality of touch films spaced apart from each other by the input.

In one implementation, the controller may determine the input as the press operation and provide second haptic feedback when the sensor senses a change in a distance between a plurality of touch films by the input.

In one implementation, the controller may determine the input as the touch operation and provide first sound feedback when the sensor senses a change in electric charge at a single touch film by the input.

In one implementation, the controller may determine the input as the swipe operation and provide third sound feedback when the sensor senses that the touch operation is maintained in one of upward, downward, leftward, and rightward directions for a first time period.

In one implementation, the controller may determine the input as the press operation and provide second sound feedback when the sensor senses a pressure having an intensity equal to or above a preset intensity by the input.

In one implementation, the controller may amplify sound feedback when the sensor senses that the input has a preset pattern.

In one implementation, the preset pattern may include that the touch is performed in a preset order.

In one implementation, the preset pattern may include that at least two of the touch operation, the press operation, and the swipe operation are performed simultaneously.

In one implementation, the preset pattern may include that the swipe is performed in a specific pattern.

According to another aspect of the present disclosure, a method for providing feedback includes sensing, by a sensor, an input signal corresponding to an input, and determining the input as at least one of a touch operation, a press operation, and a swipe operation based on the input signal, and providing feedback corresponding to the determination result.

In one implementation, the method may further include determining the input as the touch operation and providing first haptic feedback when the sensor senses a change in a quantity of electric charge at a plurality of touch films spaced apart from each other by the input.

In one implementation, the method may further include determining the input as the press operation and providing second haptic feedback when the sensor senses a change in a distance between a plurality of touch films by the input.

In one implementation, the method may further include determining the input as the touch operation and providing first sound feedback when the sensor senses a change in electric charge at a single touch film by the input.

In one implementation, the method may further include determining the input as the swipe operation and providing third sound feedback when the sensor senses that the touch operation is maintained in one of upward, downward, leftward, and rightward directions for a first time period.

In one implementation, the method may further include determining the input as the press operation and providing second sound feedback when the sensor senses a pressure having an intensity equal to or above a preset intensity by the input.

In one implementation, the method may further include amplifying sound feedback when the sensor senses that the input has a preset pattern.

In one implementation, the preset pattern may include that the touch is performed in a preset order.

In one implementation, the preset pattern may include that at least two of the touch operation, the press operation, and the swipe operation are performed simultaneously.

In one implementation, the preset pattern may include that the swipe is performed in a specific pattern.

BRIEF DESCRIPTION OF THE DRAWINGS

The above and other objects, features and advantages of the present disclosure will be more apparent from the following detailed description taken in conjunction with the accompanying drawings:

FIG. 3 is a diagram showing a description of a swipe operation and a drag operation according to the present disclosure;

DETAILED DESCRIPTION

Figure 1:
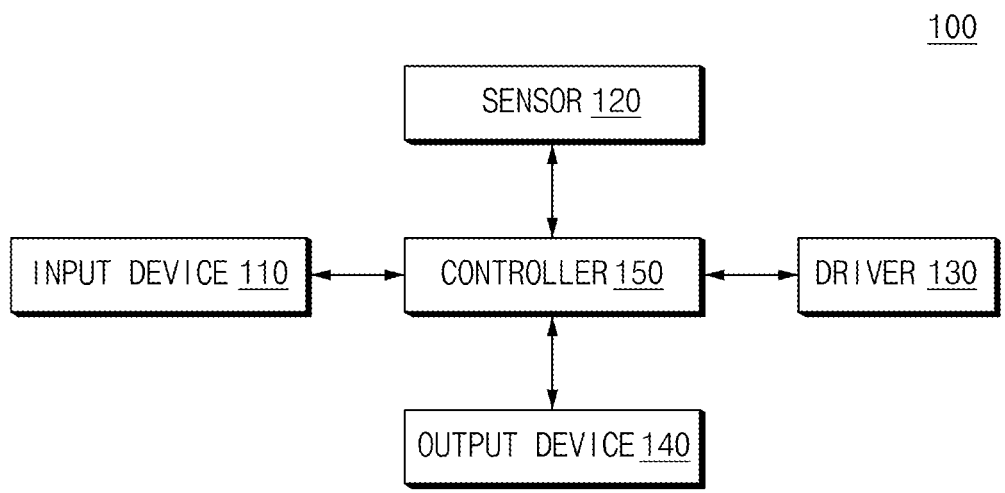
FIG. 1 is a block diagram showing configuration of a device for providing feedback based on an input according to an embodiment according of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram showing configuration of a device for providing feedback based on an input according to an embodiment of the present disclosure.

As shown in FIG. 1, a device 100 for providing feedback based on an input may include an input device 110, a sensor 120, a driver 130, an output device 140, and a controller 150.

The input device 110 may be disposed on one side of a steering wheel to output an input signal corresponding to an input of a user. The input device 110 may be implemented as a button, a touch screen, a touch pad, and the like through which the input may be performed by the user. A more detailed description of the input device 110 according to an embodiment of the present disclosure is achieved with reference to FIG. 2.

Figure 2:
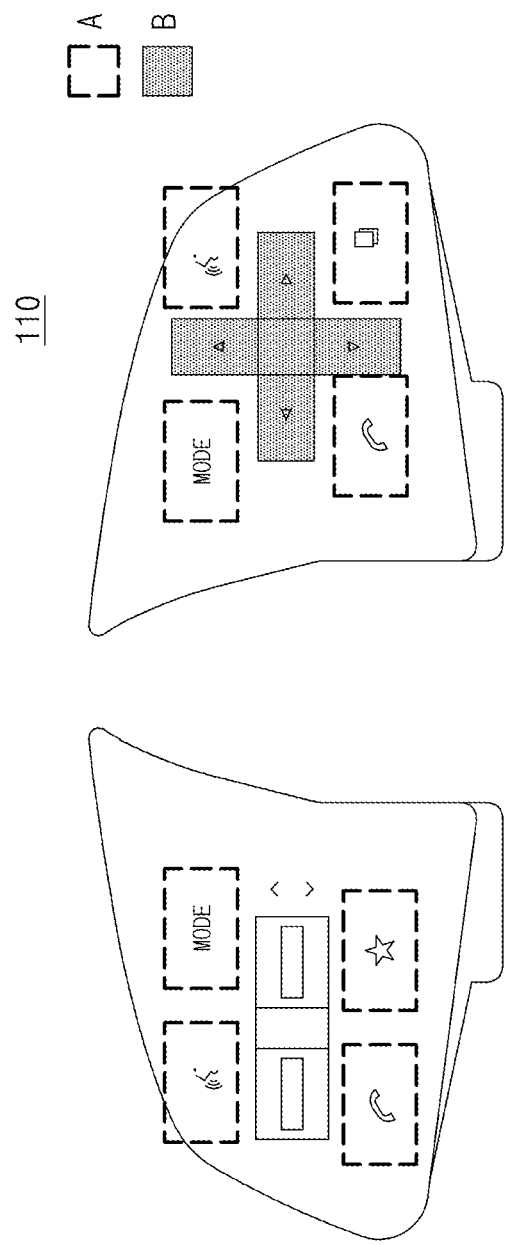
FIG. 2 is a diagram showing an input device according to an embodiment of the present disclosure.

FIG. 2 is a diagram showing an input device according to an embodiment of the present disclosure.

As shown in FIG. 2, the input device 110 according to an embodiment of the present disclosure may include a touch or press operation region A and a swipe or drag operation region B. The input device 110 may output an input signal corresponding to the input of the user in the touch or press operation region A, and may output an input signal corresponding to a manipulation of the user in the swipe or drag operation region B. In this connection, a swipe operation or a drag operation will be described with reference to FIG. 3.

FIG. 3 is a diagram showing a description of a swipe operation and a drag operation according to the present disclosure.

As shown in FIG. 3, the swipe operation may refer to an operation maintained for a first time period in one of upward, downward, leftward, and rightward directions around a center of the swipe operation region B. As an example, the swipe operation may refer to an operation of moving a distance equal to or greater than a predetermined distance (e.g., 10 mm), in the upward direction around the center of the operation region B and being maintained for a predetermined time period (e.g., 150 to 400 ms). The drag operation may refer to an operation maintained for a second time period, which is greater than the first time period, in one of the upward, downward, leftward, and rightward directions. For example, the drag operation may refer to an operation maintained for a time period equal to or greater than 500 ms in the upward direction around the center of the operation region B. The input device 110 may be allowed to output a predetermined frequency when there is a user input including the swipe operation or the drag operation described above.

According to an embodiment of the present disclosure, a plurality of touch films, spaced apart from each other by a spacer, sensed in a SELF CAP scheme or a single touch film sensed in a MUTUAL CAP scheme may be placed below the input device 110. As an example, the plurality of touch films spaced apart from each other by the spacer may be arranged below the input device 110 on a left side of the steering wheel, and the single touch film may be disposed below the input device 110 on a right side of the steering wheel.

The sensor 120 may sense the input signal corresponding to the input of the user. According to an embodiment, the sensor 120 may sense a change in a quantity of electric charge of the plurality of touch films spaced apart from each other below the input device 110, and may sense a change in a distance between the plurality of touch films. Further, the sensor 120 may sense a change in a quantity of electric charge of the single touch film disposed below the input device 110, and may sense a pressure resulted from the input of the user. In this connection, the sensor 120 may be implemented as a pressure sensor capable of sensing the pressure resulted from the input of the user.

The driver 130 may generate feedback corresponding to the input of the user. According to an embodiment, the driver 130 may include an actuator, and may create a vibration pattern or sound corresponding to the input of the user.

When the feedback corresponding to the input of the user is created as the sound, the output device 140 may output the sound. For example, the output device 140 may be implemented as a speaker.

Configuration of the input device 110, the sensor 120, the driver 130, and the output device 140 according to an embodiment of the present disclosure described above will be described in more detail with reference to FIG. 4.

Figure 4:
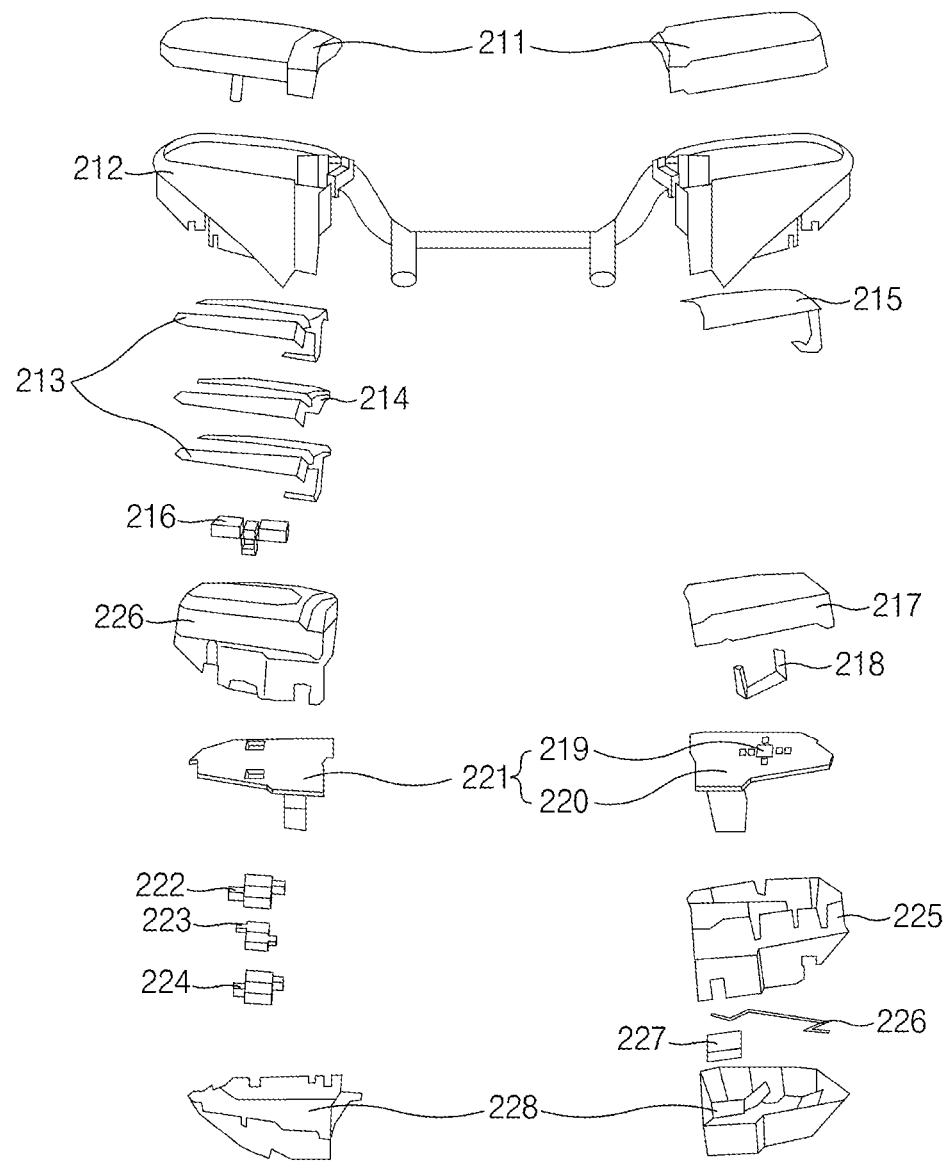
FIG. 4 is an exploded view of a device for providing feedback based on an input according to an embodiment of the present disclosure.

FIG. 4 is an exploded view of a device for providing feedback based on an input according to an embodiment of the present disclosure.

As shown in FIG. 4, the device 100 for providing the feedback based on the input may include a touch cover 211 that may receive the input of the user, and a bezel 212 surrounding the touch cover 211. A plurality of touch films 213 spaced apart from each other by a spacer 214, and a single touch film 215 may be arranged below the touch cover 211. According to an embodiment of the present disclosure, the sensor 120 may sense the touch operation or the press operation by sensing a change in a quantity of electric charge of the plurality of touch films 213 or a change in a distance between the plurality of touch films 213 resulted from the input of the user. In addition, according to another embodiment of the present disclosure, the sensor 120 may sense the touch operation or the swipe operation based on a change in a quantity of electric charge of the touch film 215 resulted from the input of the user.

A tumbler 216 may be switched in two directions or three directions based on the input of the user. A moving block 217 and a main plunger 218 serve to transfer a stroke to a pressure sensor 219 when the user presses the input device. The pressure sensor 219 may obtain a stroke value, convert the stroke value into a pressure value, and transmit the pressure value to the controller.

A main PCB 220 and a PCB assembly 221 may mean a substrate on which various integrated circuits are mounted. A haptic block 222 transmits a vibration generated by an actuator 223 to the touch cover 211. The actuator 223 may implement a haptic feedback vibration or sound feedback when the pressure is sensed when the input device is touched or pressed. An actuator cover 224 encases the actuator 223. A guide plate 225 holds the moving block 217 such that the moving block 217 does not tilt and descends constantly when the input device is pressed. A speaker 227 may output sound when the touch, the press, or the swipe (the drag) occurs. A back cover 228 may support and fix the PCB assembly, and may protect internal components.

The controller 150 may be implemented by various processing devices such as a microprocessor and the like having a built-in semiconductor chip and the like capable of performing operation or execution of various instructions, and may control an operation of the device for providing the feedback based on the input according to an embodiment of the present disclosure. Specifically, the controller 150 may determine the input of the user as at least one of the touch, the press, and the swipe operations based on the input signal corresponding to the input of the user, and provide feedback corresponding to the determination result. A more detailed operation of the controller 150 will be described with reference to FIGS. 5 to 10.

Figure 5:
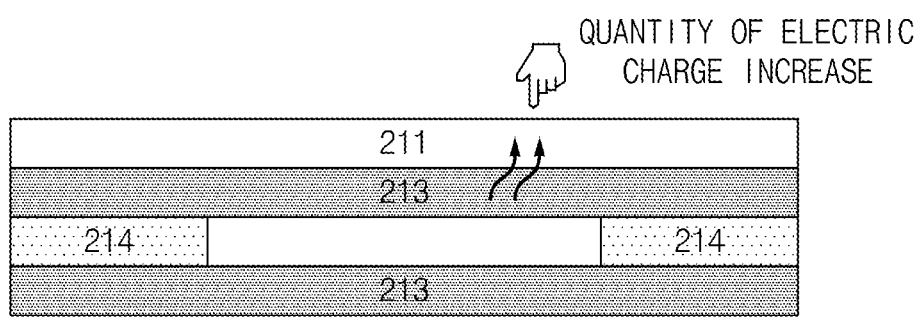
FIG. 5 is a diagram schematically showing a first scheme for sensing an input according to an embodiment of the present disclosure.
Figure 6:
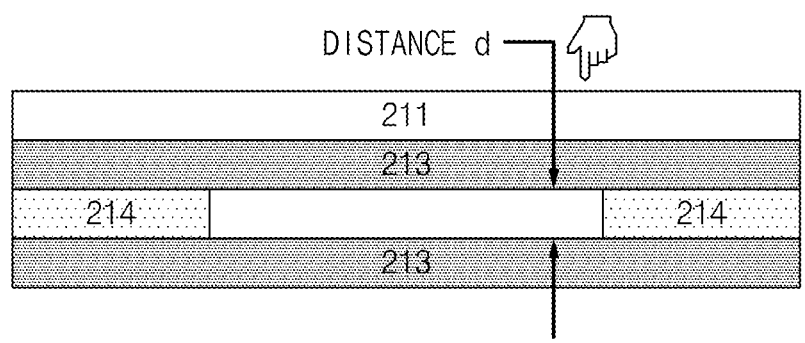
FIG. 6 is a diagram schematically showing a second scheme for sensing an input according to an embodiment of the present disclosure.

FIG. 5 is a diagram schematically showing a first scheme for sensing an input according to an embodiment of the present disclosure. FIG. 6 is a diagram schematically showing a second scheme for sensing an input according to an embodiment of the present disclosure. In addition, FIG. 7 is a diagram schematically showing feedback provided when an input is sensed using a first scheme or a second scheme according to an embodiment of the present disclosure.

Figure 7:
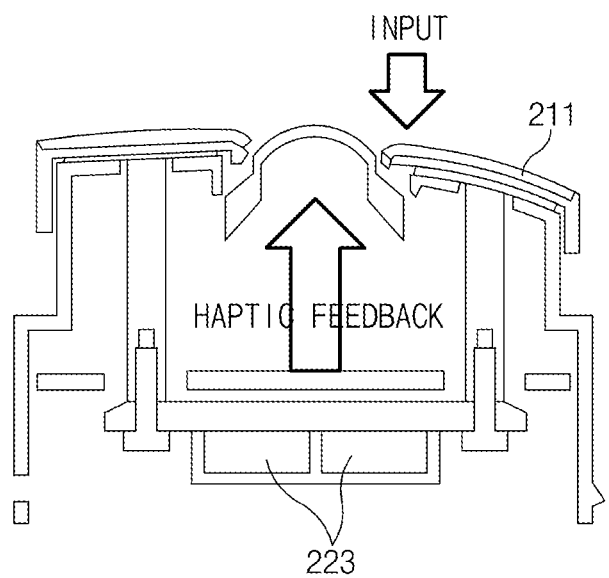
FIG. 7 is a diagram schematically showing feedback provided when an input is sensed using a first scheme or a second scheme according to an embodiment of the present disclosure.

As shown in FIG. 5, when the sensor 120 senses the change in the quantity of electric charge resulted from the input of the user at the plurality of touch films 213 spaced apart from each other, the controller 150 may determine the input of the user as the touch operation, and may drive the actuator 223 to provide first haptic feedback as shown in FIG. 7.

Further, as shown in FIG. 6, when the sensor 120 senses the change in the distance between the plurality of touch films 213 resulted from the input of the user, the controller 150 may determine the input of the user as the press operation, and may drive the actuator 223 to provide second haptic feedback as shown in FIG. 7.

Figure 8:
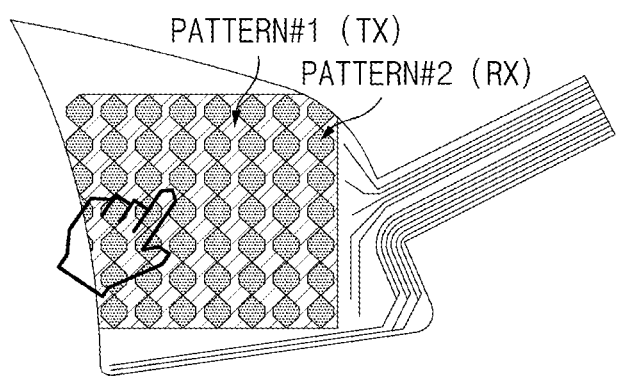
FIG. 8 is a diagram schematically showing a third scheme for sensing an input according to an embodiment of the present disclosure.
Figure 9:
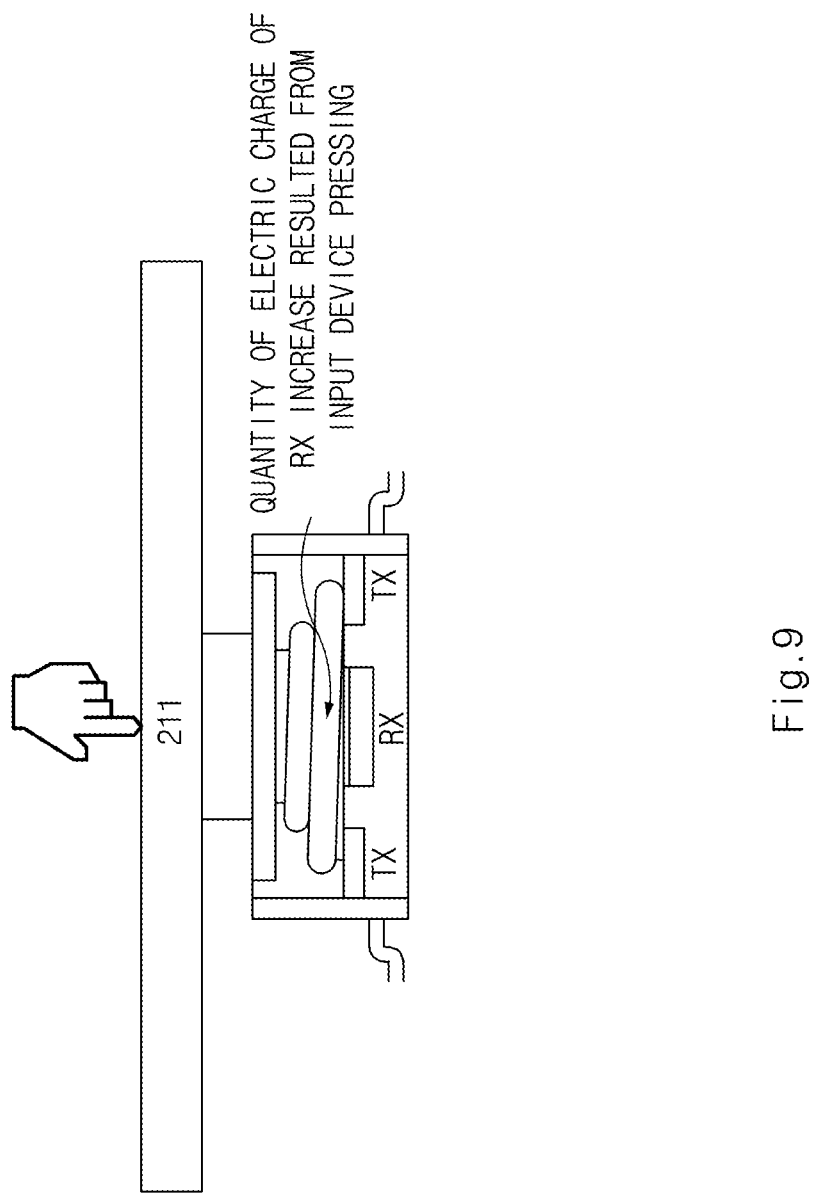
FIG. 9 is a diagram schematically showing a fourth scheme for sensing an input according to an embodiment of the present disclosure.

FIG. 8 is a diagram schematically showing a third scheme for sensing an input according to an embodiment of the present disclosure. FIG. 9 is a diagram schematically showing a fourth scheme for sensing an input according to an embodiment of the present disclosure. In addition, FIG. 10 is a diagram schematically showing feedback provided when an input is sensed using a third scheme or a fourth scheme according to an embodiment of the present disclosure.

As shown in FIG. 8, the single touch film may have a plurality of first patterns and a plurality of second patterns different from the plurality of first patterns. The second pattern may include at least one or more longitudinal patterns formed by connecting a plurality of hexagonal patterns in direction of column and each longitudinal pattern may be separated from each other. The first pattern may include a plurality of patterns that fill a plurality of areas between the longitudinal patterns. When the sensor 120 senses the change in the quantity of electric charge at the single touch film resulted from a change in a contact region having a pattern by the input of the user, the controller 150 may determine the input of the user as the touch operation, and may output the sound through the speaker 227 to provide first sound feedback as shown in FIG. 10.

Figure 10:
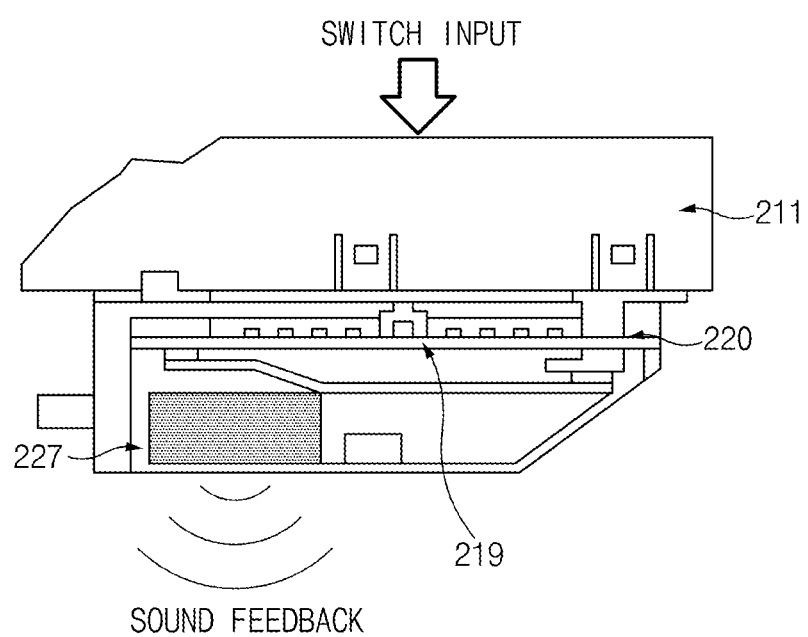
FIG. 10 is a diagram schematically showing feedback provided when an input is sensed using a third scheme or a fourth scheme according to an embodiment of the present disclosure.

Further, as shown in FIG. 9, when the sensor 120 senses a pressure having an intensity equal to or above a preset intensity resulted from the input of the user, the controller 150 may determine the input of the user as the press operation, and may output the sound through the speaker 227 to provide second sound feedback as shown in FIG. 10.

Further, although not shown, when the sensor 120 senses that the touch operation is maintained for the first time period in one of the upward, downward, leftward, and rightward directions, the controller 150 may determine the input of the user as the swipe operation, and may output the sound through the speaker 227 to provide third sound feedback as shown in FIG. 10.

When the sensor 120 senses that the input of the user has a preset pattern, the controller 150 may amplify the sound feedback. In this connection, the preset pattern may include that the touch is performed in a preset order, may include that at least two of the touch, the press, and the swipe operations are performed simultaneously, and may include that the swipe is performed in a specific pattern.

For example, when a time period from an nth input to an (n+1)th input is equal to or less than 2 seconds, and when a time required for the input of the user is equal to or less than 10 seconds, the controller 150 may determine that there is the input of the user based on a preset order and amplify the sound feedback. Further, when there is a user input in which the touch operations are performed simultaneously in different touch regions, or when there is a user input in which the touch operation and the press operation are performed simultaneously, the controller 150 may amplify the sound feedback. Further, when there is a user input in which the press operation is performed with the right input device and the touch operation is performed with the left input device, the controller 150 may amplify the sound feedback.

Figure 11:
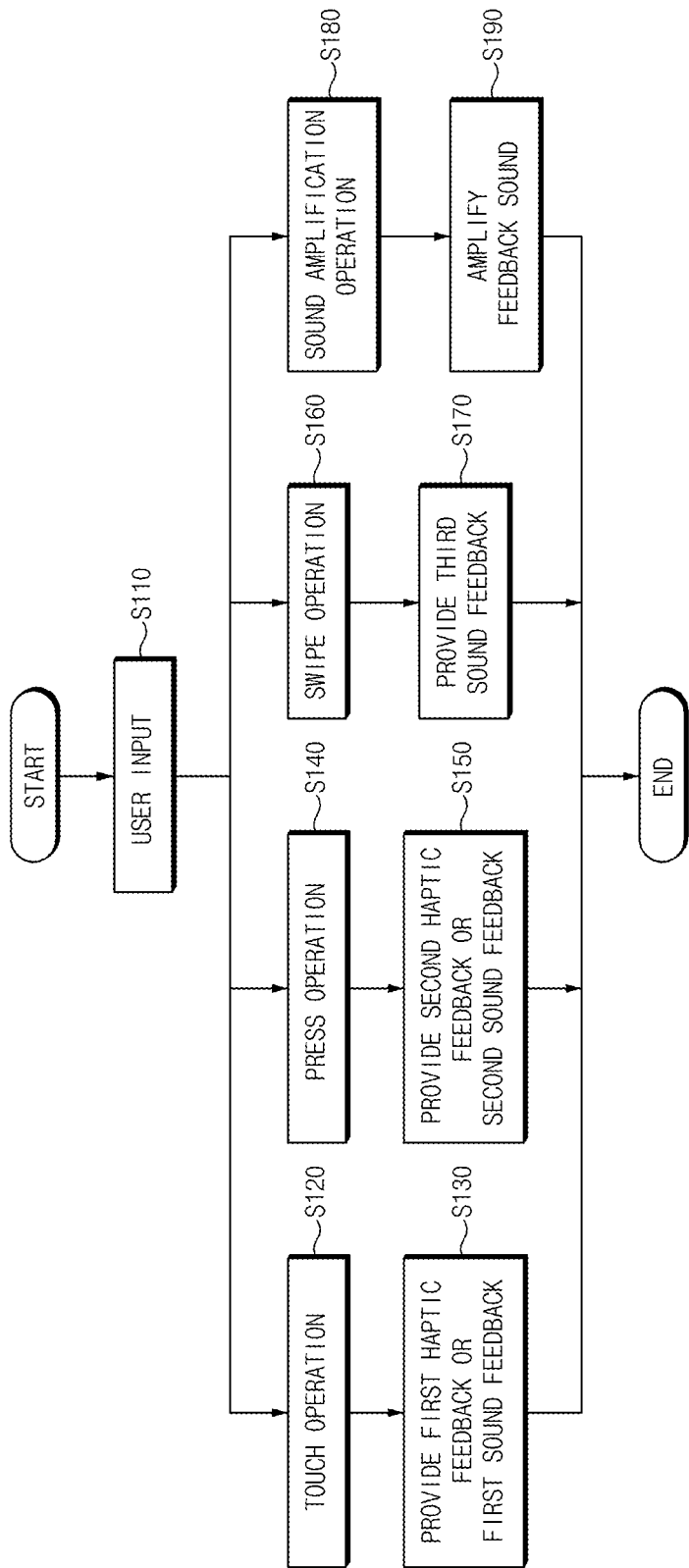
FIG. 11 is a diagram showing a method for providing feedback based on an input according to an embodiment of the present disclosure.

FIG. 11 is a diagram showing a method for providing feedback based on an input according to an embodiment of the present disclosure.

As shown in FIG. 11, the input device 110 may output the input signal corresponding to the input of the user (S110).

The controller 150 may determine what operation the input of the user is based on the input signal corresponding to the input of the user sensed by the sensor 120.

According to an embodiment, when determining the input of the user as the touch operation based on the input signal corresponding to the input of the user (S120), the controller 150 may control to provide the first haptic feedback or the first sound feedback (S130). According to an embodiment, when the sensor 120 senses the change in the quantity of electric charge of the plurality of touch films in S120, the controller 150 may determine the input of the user as the touch operation. In this case, the controller 150 may control to provide the first haptic feedback in S130. According to another embodiment, when the sensor 120 senses the change in the quantity of electric charge of the single touch film disposed below the input device 110 in S120, the controller 150 may determine the input of the user as the touch operation. In this case, the controller 150 may control to provide the first sound feedback in S130.

When the input of the user is determined as the press operation based on the input signal corresponding to the input of the user (S140), the controller 150 may control to provide the second haptic feedback or the second sound feedback (S150). According to an embodiment, when the sensor 120 senses the change in the distance between the plurality of touch films in S140, the controller 150 may determine the input of the user as the press operation. In this case, the controller 150 may control to provide the second haptic feedback in S150. According to another embodiment, when the sensor (the pressure sensor) 120 senses the pressure having the intensity equal to or above the preset intensity resulted from the input of the user in S140, the controller 150 may determine the input of the user as the press operation. In this case, the controller 150 may control to provide the second sound feedback in S150.

When determining the input of the user as the swipe operation based on the input signal corresponding to the input of the user (S160), the controller 150 may control to provide the third sound feedback (S170). According to an embodiment, when the sensor 120 senses that the touch operation is maintained in one of the upward, downward, leftward, and rightward directions for the first time period in S160, the controller 150 may determine the input of the user as the swipe operation. In this case, the controller 150 may control to provide the third sound feedback in S170.

When determining the input of the user as a sound amplification operation based on the input signal corresponding to the input of the user (S180), the controller 150 may control to amplify the feedback sound (S190).

According to an embodiment, when the sensor 120 senses that the input of the user has the preset pattern in S180, the controller 150 may determine the input of the user as the sound amplification operation. In this connection, the preset pattern may include that the touch is performed in the preset order, may include that the at least two of the touch, the press, and the swipe operations are performed simultaneously, and may include that the swipe is performed in the specific pattern. In this case, the controller 150 may amplify the sound feedback in S190.

Figure 12:
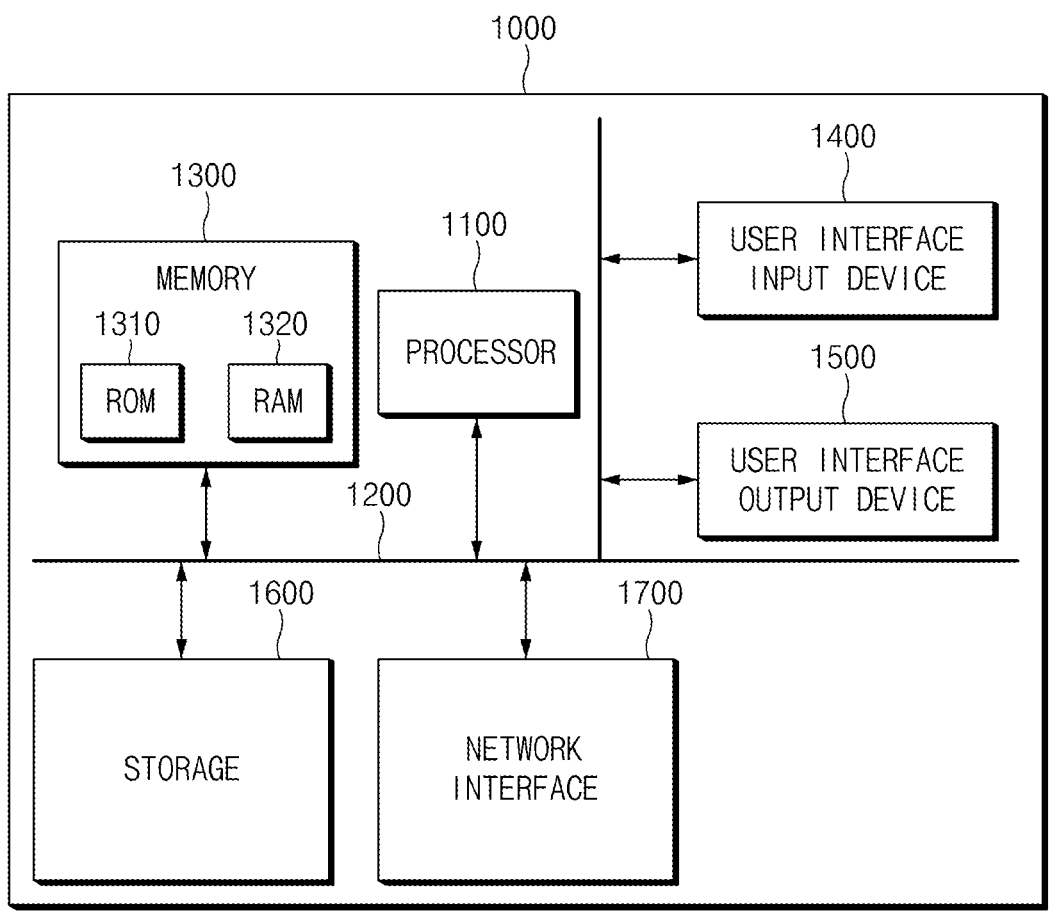
FIG. 12 is a diagram showing configuration of a computing system executing a method according to an embodiment of the present disclosure.

FIG. 12 is a diagram showing configuration of a computing system executing a method according to an embodiment of the present disclosure.

Referring to FIG. 12, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for providing the feedback based on the input according to the present disclosure may provide the feedback using the haptic or the sound output scheme based on the input of the user, thereby allowing the user to intuitively recognize the input function. Further, the device for providing the feedback based on the input according to the present disclosure allows the sound output to be amplified when the preset pattern is input, thereby providing an effect of amplifying an intensity of the sound without disassembling a product.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for providing feedback, the device comprising:
    a sensor configured to sense an input signal corresponding to an input; and
    a controller configured to:
        determine the input as at least one of a touch operation, a press operation, or a swipe operation based on the input signal; and
        provide feedback corresponding to the determination result,
    wherein the controller is configured to determine the input as the touch operation and provide first sound feedback, when the sensor senses a change in a quantity of electric charge at a single touch film resulted from a change in a contact region of the single touch film by the input,
    wherein the single touch film has a plurality of first patterns and a plurality of second patterns different from the plurality of first patterns,
    wherein the second pattern includes at least one or more longitudinal patterns formed by connecting a plurality of hexagonal patterns in direction of column and each longitudinal pattern is separated from each other, and
    wherein the first pattern includes a plurality of patterns that fill a plurality of areas between the longitudinal patterns.

2. The device of claim 1, wherein the controller is configured to determine the input as the touch operation and provide first haptic feedback when the sensor senses a change in a quantity of electric charge at a plurality of touch films spaced apart from each other by the input.

3. The device of claim 1, wherein the controller is configured to determine the input as the press operation and provide second haptic feedback when the sensor senses a change in a distance between a plurality of touch films by the input.

4. The device of claim 1, wherein the controller is configured to determine the input as the swipe operation and provide third sound feedback when the sensor senses that the touch operation is maintained in one of upward, downward, leftward, and rightward directions for a first time period.

5. The device of claim 1, wherein the controller is configured to determine the input as the press operation and provide second sound feedback when the sensor senses a pressure having an intensity equal to or above a preset intensity by the input.

6. The device of claim 1, wherein the controller is configured to amplify sound feedback when the sensor senses that the input has a preset pattern.

7. The device of claim 6, wherein the preset pattern includes that the touch operation is performed in a preset order.

8. The device of claim 6, wherein the preset pattern includes that at least two of the touch operation, the press operation, and the swipe operation are performed simultaneously.

9. The device of claim 6, wherein the preset pattern includes that the swipe operation is performed in a specific pattern.

10. A method for providing feedback, the method comprising:
    sensing, by a sensor, an input signal corresponding to an input; and
    determining, by a controller, the input as at least one of a touch operation, a press operation, or a swipe operation based on the input signal, and providing feedback corresponding to the determination result,
    wherein when the sensor senses a change in a quantity of electric charge at a single touch film resulted from a change in a contact region of the single touch film by the input, the input is determined by the controller as the touch operation and first sound feedback is provided, and
    wherein the single touch film has a plurality of first patterns and a plurality of second patterns different from the plurality of first patterns,
    wherein the second pattern includes at least one or more longitudinal patterns formed by connecting a plurality hexagonal patterns in direction of column and each longitudinal pattern is separated from each other, and
    wherein the first pattern includes a plurality of patterns that fill a plurality of areas between the longitudinal patterns.

11. The method of claim 10, further comprising:
    determining the input as the touch operation and providing first haptic feedback when the sensor senses a change in a quantity of electric charge at a plurality of touch films spaced apart from each other by the input.

12. The method of claim 10, further comprising:
    determining the input as the press operation and providing second haptic feedback when the sensor senses a change in a distance between a plurality of touch films by the input.

13. The method of claim 10, further comprising:
    determining the input as the swipe operation and providing third sound feedback when the sensor senses that the touch operation is maintained in one of upward, downward, leftward, and rightward directions for a first time period.

14. The method of claim 10, further comprising:
    determining the input as the press operation and providing second sound feedback when the sensor senses a pressure having an intensity equal to or above a preset intensity by the input.

15. The method of claim 10, further comprising:
    amplifying sound feedback when the sensor senses that the input has a preset pattern.

16. The method of claim 15, wherein the preset pattern includes that the touch is performed in a preset order.

17. The method of claim 15, wherein the preset pattern includes that at least two of the touch operation, the press operation, and the swipe operation are performed simultaneously.

18. The method of claim 15, wherein the preset pattern includes that the swipe is performed in a specific pattern.

* * * * *